2,886,133
OIL MIST TURBINE LUBRICATION

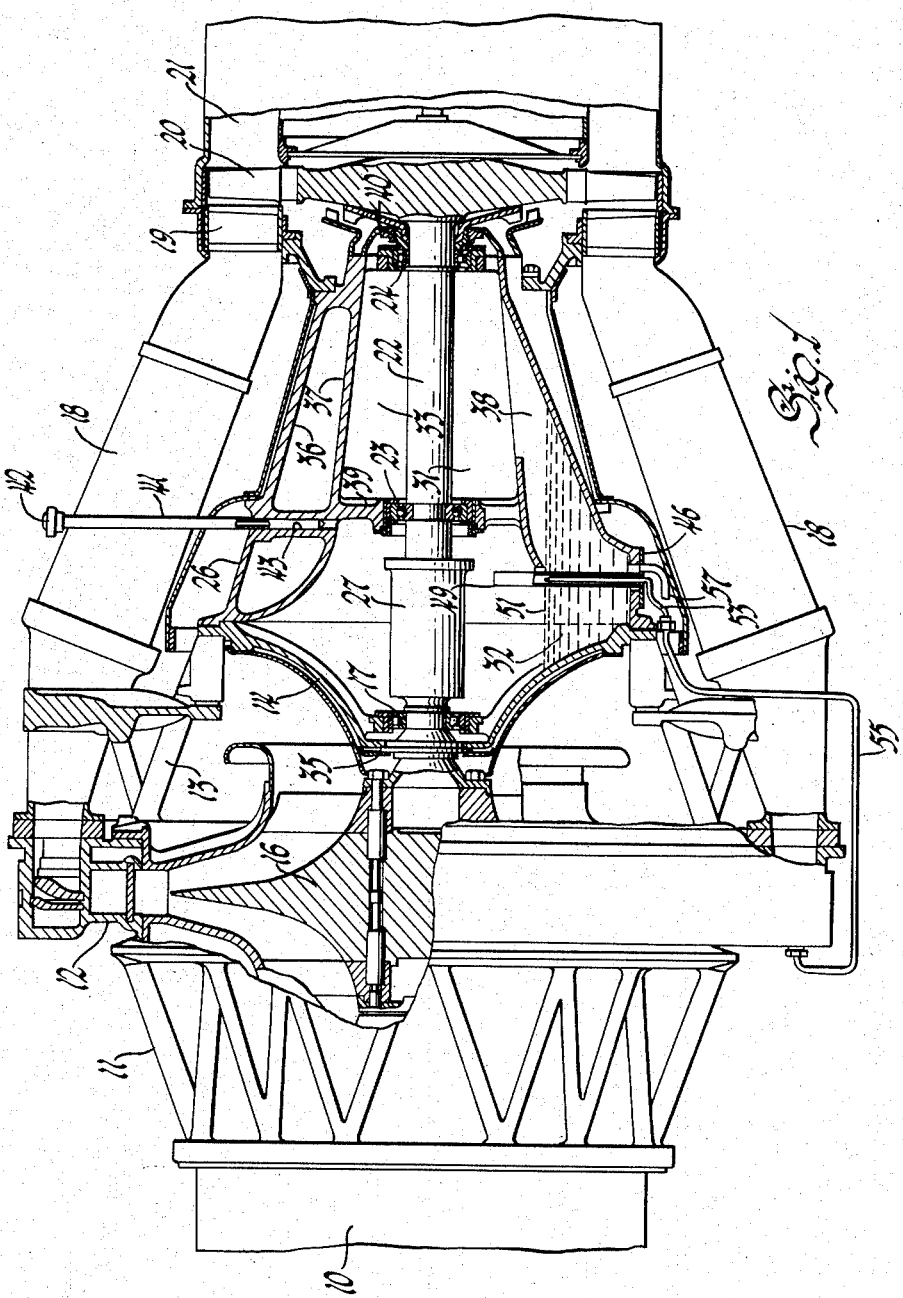

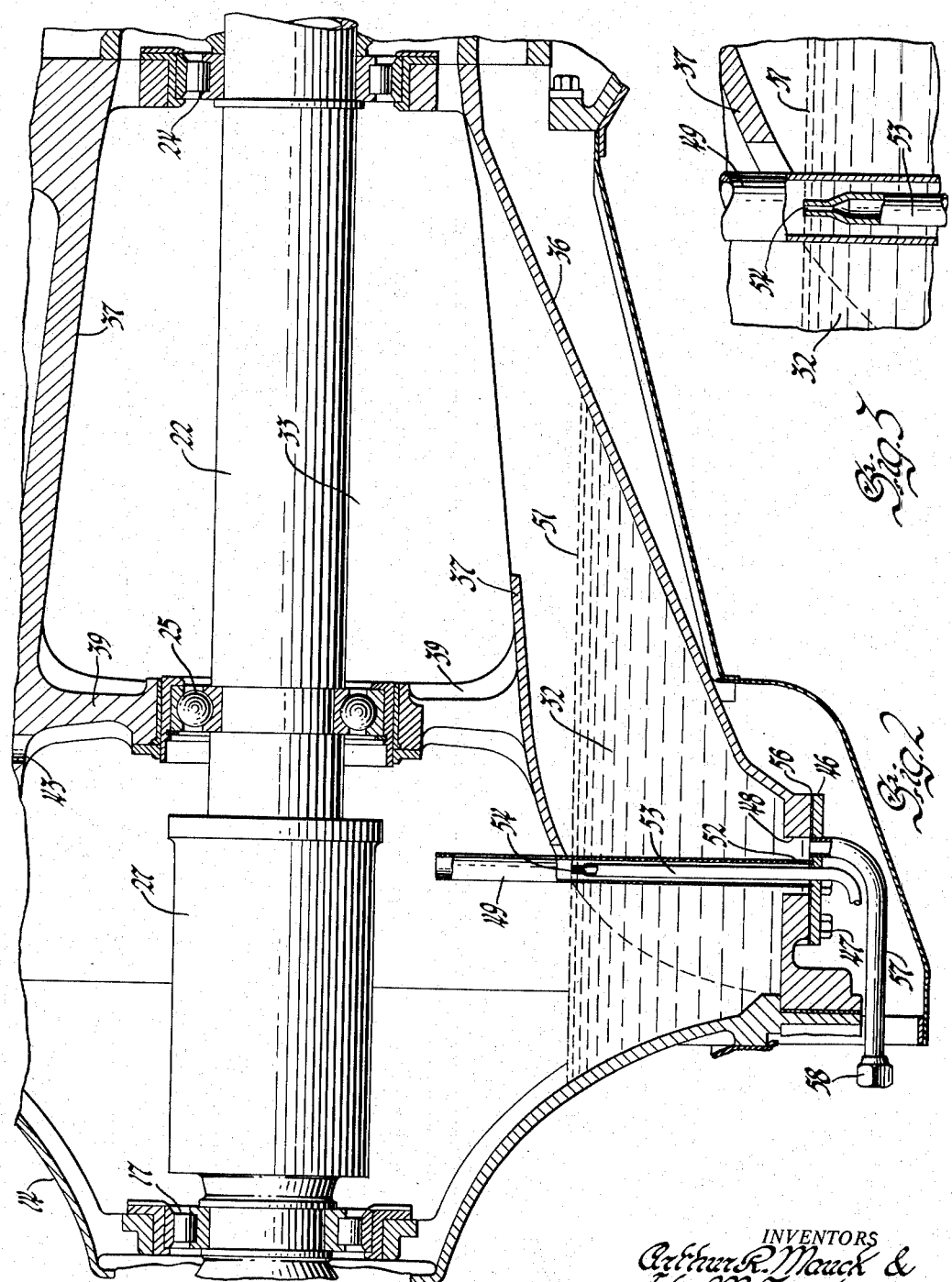

Arthur R. Mauck, Indianapolis, and John M. Zorad, Danville, Ind., assignors to General Motors Corporation, Detroit, Mich., a corporation of Delaware Application November 30, 1955, Serial No. 550,133

3 Claims. (Cl. 184—6)

This invention relates to lubricating systems of the oil mist type particularly suited for use in gas turbine engines but capable of application elsewhere. The principal object of the invention is to provide a lubricating system of minimum weight and complexity and maximum reliability particularly suited for engines which have bearings or other moving parts requiring lubrication within a closed case.

The nature of the invention may be more readily apparent from the brief statement that it involves the provision of an oil sump containing a supply of oil in an engine case in which parts are to be lubricated, and an atomizing ejector is provided which, under the action of compressed air, picks up and atomizes the oil and diffuses it throughout the case so that it may settle on the parts requiring lubrication. Oil flung off from the moving parts or settling on the walls of the case will drain to the sump so that the circulation of the oil mist may be maintained. The invention is particularly suited to gas turbine engines in which the compressor provides a supply of compressed air to effect the atomization of the oil.

The nature of the invention and the advantages thereof will be more clearly apparent to those skilled in the art from the succeeding detailed description of the preferred embodiment of the invention and the accompanying drawings, in which:

Figure 1 is a longitudinal sectional view of a turbojet engine incorporating the invention;

Figure 2 is an enlarged sectional view of the frame or case of the engine; and

Figure 3 is a still further enlarged view of a detail.

Referring first to Figure 1, there is shown a turbojet engine of the J-33 type which, except as regards the lubrication system of the invention, may be regarded as the same as that shown in U.S. Patent 2,432,359. Since the engine is well known and is described in the patent, the details need not be entered into here. Briefly, the engine includes an accessory section 10 joined by a lattice work compressor inlet frame 11 to a compressor diffuser or case 12 which in turn is connected by a lattice work rear compressor inlet frame 13 to annular compressor bearing support 14. A double entry centrifugal compressor comprising a rotor 16 is supported in a forward bearing (not shown) and a rear bearing 17 mounted in the support 14. The compressor draws air through the inlets 11 and 13 and discharges it into the diffuser 12 which supplies a number of combustion chambers 18, the combustion products from which flow through turbine nozzle 19 to a turbine wheel 20 and through an exhaust duct 21 to the jet propulsion nozzle of the engine (not shown). The turbine wheel is integral with a shaft 22 mounted in a front bearing 23 and a rear bearing 24. These bearings are supported in an annular cast frame 26 bolted to the compressor bearing mount 14. The parts 26 and 14 constitute a closed case within which bearings 17, 23 and 24 requiring lubrication are mounted. An internally splined coupling member 27 couples the turbine and compressor shafts. Bearings 17, 23 and 24 are preferably of an anti-friction type as illustrated.

The engine has hitherto been provided with a force feed oil system with jets discharging streams of oil onto these bearings. Such a system requires a pressure pump and a scavenge pump to return the oil to the pressure pump. In the system according to this invention all of this is dispensed with by the provision of a simple atomizing device for oil contained within the chamber 31 defined by the case 14, 26. The lower portion of the chamber constitutes an oil sump 32 as indicated on the drawings and the upper portion 33 constitutes an air space within which the moving parts are located. Referring now in more detail to the structure of the frame 26, it will be noted that it is of a double walled construction with an outer wall 36 and a partially complete inner wall 37. Ribs 38 between the walls stiffen the structure. Bearing 23 is supported in a diaphragm 39. The case is sealed by a contact type seal 35 adjacent bearing 17 and a labyrinth seal 40 adjacent the turbine wheel.

An oil filler tube 41, normally closed by cap 42, is fitted in a bore 43 extending radially of the engine into the chamber 31. A plate 46 secured by cap screws 47 over an opening 48 at the lowest point of the case supports a tubular member or standpipe 49 which extends above the normal level of the oil in the case indicated by the dotted line 51. A small opening 52 at the lower end of tube 49 permits oil to enter the tube from the sump. A compressed air tube 53 mounted concentrically within the tube 49 is supported in the plate 46. Tube 53 terminates in a restricted air nozzle 54 approximately at the normal oil level. This tube may be connected to any suitable source of compressed gas, preferably to the diffuser 12 of the compressor by pipe 55, so that air under pressure is supplied to tube 53 when the engine is in operation. Tubes 53 and 49 act as an atomizing ejector, the compressed air spraying a fog or mist of oil in air from the open upper end of tube 49 into the space 33. This fog or mist surrounds the bearings 17, 23 and 24 and the splined coupling 27 and provides sufficient lubrication for these parts. Oil settling on the parts may be thrown off by centrifugal force to the walls of the case and oil settling on the walls of the case in this way, or directly from the mist, will drain down into the sump. The air supplied through pipe 55 pressurizes the case, causing oil-air mist to leak off through bearing 24 and labyrinth seal 40. This increases the lubrication of bearing 24, which is in a relatively hot area. It will be apparent that this structure provides a very simple means for distributing lubricant throughout the engine case. A gasket 56 may be mounted between the plate 46 and the case. An oil drain tube 57 mounted in the plate 46 may normally be closed by cap 58. Tubes 49, 53 and 57 may be brazed to plate 46.

As will be apparent, all that is necessary to secure the lubrication of the parts shown is to put the required quantity of oil into the case through the filler 41 before starting the engine. When the engine is started, air pressure from the engine compressor will force a jet of air through the nozzle 54 which will aspirate and atomize the oil and distribute it through the case. The light weight, simplicity, and reliability of this system will be apparent. It serves to eliminate a rather complicated, expensive, and heavy lubrication system involving pressure pumps and scavenge pumps previously employed.

The detailed description herein of the preferred embodiment of the invention for the purposes of explaining the principles thereof is not to be construed as limiting or restricting the invention, as many modifications may be made within the scope of the invention by the exercise of skill in the art.

We claim:

1. In combination with a gas turbine engine comprising a compressor, a turbine, a shaft coupling the turbine to the compressor, a closed case defining a chamber enclosing the shaft, and bearings for the shaft in the case including a bearing adjacent the turbine in free communication with the chamber; a lubricating system for the bearings comprising an oil sump adapted to contain lubricating oil defined by a lower portion of the case below the bearings, a tubular member extending from the lower portion of the sump into the chamber above the sump and having an entrance for oil adjacent the bottom of the sump, an air nozzle within the tubular member, a conduit connecting the nozzle to the outlet of the compressor, the tubular member and nozzle constituting an atomizing ejector adapted to nebulize and diffuse the oil throughout the case to lubricate the bearings, the air flow from the nozzle pressurizing the case, and a labyrinth type seal between the shaft and case disposed between the bearing adjacent the turbine and the turbine providing controlled leakage of the oil mist through the said bearing, the case being otherwise sealed against leakage of air therefrom.

2. In combination with a gas turbine engine comprising a compressor, a turbine, a shaft coupling the turbine to the compressor, a closed case defining a chamber enclosing the shaft, and bearings for the shaft in the case including a bearing adjacent the turbine and a bearing adjacent the compressor in free communication with the chamber; a lubricating system for the bearings comprising an oil sump adapted to contain lubricating oil defined by a lower portion of the case below the bearings, an atomizing ejector, including an air nozzle, adapted to nebulize and diffuse the oil from the sump throughout the case to lubricate the bearings, a conduit connecting the air nozzle to the outlet of the compressor, the air flow from the nozzle pressurizing the case, a labyrinth type seal between the shaft and case disposed between the bearing adjacent the turbine and the turbine providing controlled leakage of the oil mist through the said bearing, and a contact type seal between the shaft and case at the bearing adjacent the compressor.

3. In combination with a gas turbine engine comprising a compressor, a turbine, a shaft coupling the turbine to the compressor, a closed case defining a chamber enclosing the shaft, and bearings for the shaft in the case including a bearing adjacent the turbine and a bearing adjacent the compressor in free communication with the chamber; a lubricating system for the bearings comprising an oil sump adapted to contain lubricating oil defined by a lower portion of the case below the bearings, a tubular member extending from the lower portion of the sump into the chamber above the sump and having an entrance for oil adjacent the bottom of the sump, an air nozzle within the tubular member, a conduit connecting the nozzle to the outlet of the compressor, the tubular member and nozzle constituting an atomizing ejector adapted to nebulize and diffuse the oil throughout the case to lubricate the bearings, the air flow from the nozzle pressurizing the case, a labyrinth type seal between the shaft and case disposed between the bearing adjacent the turbine and the turbine providing controlled leakage of the oil mist through the said bearing, and a contact type seal between the shaft and case at the bearing adjacent the compressor.

References Cited in the file of this patent

UNITED STATES PATENTS

| | | |
|---|---|---|
| 1,824,540 | Gronkwist | Sept. 2, 1931 |
| 2,614,386 | McLeod | Oct. 21, 1952 |

FOREIGN PATENTS

| | | |
|---|---|---|
| 25,644 | Great Britain | of 1911 |